US006505054B1

(12) United States Patent
Douglas et al.

(10) Patent No.: US 6,505,054 B1
(45) Date of Patent: Jan. 7, 2003

(54) INTEGRATED ANTENNA ASSEMBLIES INCLUDING MULTIPLE ANTENNAS FOR WIRELESS COMMUNICATIONS DEVICES

(75) Inventors: Mark Gordon Douglas, Cary, NC (US); Gerard James Hayes, Wake Forest, NC (US); Howard Holshouser, Efland, NC (US); Nils Rydbeck, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/349,044

(22) Filed: Jul. 7, 1999

(51) Int. Cl.[7] ................................................ H04B 1/38
(52) U.S. Cl. ...................................... 455/552; 455/456
(58) Field of Search .......................... 455/90, 129, 269, 455/272, 277.1, 414, 456, 550, 552, 553, 562; 343/872, 725, 790, 702, 905

(56) References Cited

U.S. PATENT DOCUMENTS

| | | | | | |
|---|---|---|---|---|---|
| 5,490,284 | A | * | 2/1996 | Itoh et al. | 455/11.1 |
| 5,600,341 | A | | 2/1997 | Thill et al. | 343/895 |
| 5,652,631 | A | * | 7/1997 | Bullen et al. | 343/753 |
| 5,867,765 | A | | 2/1999 | Nilsson | 455/13.1 |
| 5,884,214 | A | | 3/1999 | Krasner | 701/207 |
| 5,977,928 | A | * | 11/1999 | Ying et al. | 343/702 |
| 6,087,990 | A | * | 7/2000 | Thill et al. | 343/700 MS |
| 6,097,974 | A | * | 8/2000 | Camp et al. | 342/357.1 |
| 6,160,512 | A | * | 12/2000 | Desclos et al. | 343/700 MS |
| 6,272,324 | B1 | * | 8/2001 | Rudisill et al. | 379/433.13 |
| 6,298,243 | B1 | * | 10/2001 | Basile | 455/552 |
| 6,313,801 | B1 | * | 11/2001 | Sanford et al. | 343/700 MS |
| 6,320,549 | B1 | * | 11/2001 | Nybeck et al. | 343/702 |
| 6,326,921 | B1 | * | 12/2001 | Egorov et al. | 343/700 MS |
| 6,327,485 | B1 | * | 12/2001 | Waldron | 343/702 |

FOREIGN PATENT DOCUMENTS

| | | | |
|---|---|---|---|
| DE | 198 37 568 | A | 6/1999 |
| DE | 19837568 | A1 | 6/1999 |
| EP | 0 747 990 | A1 | 12/1996 |
| FR | 2 754 942 | | 4/1998 |
| WO | WO 98/18175 | | 4/1998 |

OTHER PUBLICATIONS

International Search Report, PCT/US00/16517, Sep. 28, 2000.
U.S. patent application Ser. No. 09/193,587, Camp, Jr., filed Nov. 17, 1998.

* cited by examiner

*Primary Examiner*—Dwayne Bost
*Assistant Examiner*—Joy K. Contee
(74) *Attorney, Agent, or Firm*—Myers Bigel Sibley & Sajovec

(57) ABSTRACT

A wireless communications device includes an integrated antenna assembly that provides signals associated with multiple functions to the wireless communications device. The integrated antenna assembly includes an integrated antenna housing coupled to a radiotelephone housing and multiple antennas. The integrated antenna housing can include a first antenna that provides GPS signal reception for a GPS receiver and a second antenna that provides communications signals to and from a radiotelephone processor in the radiotelephone housing. The first and second antennas can be mounted on an antenna backing having a first face and a second face. The first and second antennas may be located on the same face of the antenna backing or on opposite faces of the antenna backing. The integrated antenna assembly also can include a third antenna located between the first and second antennas. In this case, the first and second antennas are high-band antennas and the third antenna, located therebetween, is a low-band antenna which can reduce the electromagnetic coupling between the first and second high-band antennas.

52 Claims, 4 Drawing Sheets

INTEGRATED ANTENNA ASSEMBLIES INCLUDING MULTIPLE ANTENNAS FOR WIRELESS COMMUNICATIONS DEVICES

FIELD OF THE INVENTION

The present invention relates to the field of communications in general and more particularly to antennas.

BACKGROUND OF THE INVENTION

A wireless communication device, such as a cellular radiotelephone, may include an antenna to enable the wireless communication device to receive and/or transmit signals associated with a wireless service. For example, a GSM type cellular radiotelephone may include an antenna which allows the cellular radiotelephone to function in a GSM system. Such antennas may be adapted for connection to the enclosure of the wireless communications device. However, the physical characteristics of the antenna (such as size) may affect the cost of the wireless communications device.

As wireless services become more popular, there may be a desire to support multiple wireless services using one wireless communications device. For example, it is known to provide Global Positioning System (GPS) functionality along with the radiotelephone functionality described above in a single wireless communication device. Such wireless communications devices are described, for example, in copending U.S. patent application Ser. No. 09/193,587 to Camp, Jr. entitled "Portable Radio Telephones Including Patch Antennas " and assigned to the assignee of the present application which is incorporated herein by reference. Unfortunately, supporting both GPS and radiotelephone functionalities may further increase the cost of the wireless communications device. Consequently, there is a need to provide wireless communications devices that support both GPS and radiotelephone functionalities while reducing the cost associated with supporting the additional wireless services in the wireless communications device.

SUMMARY OF THE INVENTION

It is, therefore, an object of the present invention to provide improved wireless communications devices.

It is another object of the present invention to further reduce the cost of supporting both GPS and communications functionalities in a wireless communications device.

These and other objects of the present invention are provided by a wireless communications device having an integrated antenna housing that includes a GPS antenna and a first antenna. The GPS antenna provides reception of GPS signals at the wireless communications device which are used to determine a location of the wireless communications device. The first antenna provides reception and transmission of communications signals, such as those used in a PCS or DCS cellular radiotelephone system. Integrating the GPS antenna and the first antenna into the same antenna housing can reduce the cost of manufacturing a wireless communications device that supports multiple functionalities. In addition, as the sizes of wireless communications devices are reduced it may be increasingly difficult to couple multiple antenna housings to a wireless communications device without affecting the functionality and/or aesthetics of the wireless communications device.

In a further aspect of the present invention, the antennas in the integrated antenna assembly are mounted on a common antenna backing in the integrated antenna housing. The antenna backing can include first and second faces, and the GPS antenna and the first antenna can be mounted on a common face of the antenna backing or on opposite faces. The antenna backing may comprise a dielectric material.

In another aspect of the present invention, a second antenna is included in the integrated antenna assembly. Accordingly, the user may operate the wireless communications device in one of multiple communications systems. The second antenna can be mounted between the GPS and first antenna. The first, second, and GPS antennas can each be mounted on any face of the antenna backing.

In an unexpected aspect of the invention, the integrated antenna housing can include a first high-band antenna, a second high-band antenna, and a low-band antenna located therebetween. Locating the low-band antenna between the first high-band antenna and the second high-band antenna may reduce electromagnetic coupling between the first and second high-band antennas in the integrated antenna assembly. For example, if a GPS antenna operates in a frequency range between about 1574 to 1576 MHz and the first antenna operates in a frequency range between about 1710 to 1880 MHz and the second antenna operates in a range between about 880 to 960 MHz, locating the second antenna between the first antenna and the GPS antenna may reduce the electromagnetic coupling between the first antenna and the GPS antenna.

The integrated antenna housing of the present invention can thus reduce the cost of a radiotelephone that provides multiple functions such as cellular communications and GPS functionality. The integrated antenna housing can also reduce the size of a radiotelephone and increase the aesthetic appeal.

BRIEF DESCRIPTION IF THE FIGURES

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the present invention are disclosed herein by reference to a wireless communications device including cellular antennas and GPS antennas operating in a cellular communications system and providing GPS functionality. However, it will be understood that the scope of the present invention includes any antennas adapted for use with a wireless communications device and is not limited to cellular antennas or GPS antennas.

As used herein, the phrases "low band antenna" and "high band antenna" include antennas that provide respective low and high frequency communications signals to and from a wireless communications device. Low band antennas allow for the operation of the wireless communications device in frequency ranges which are lower than the frequency ranges in which the high band antennas allow for the operation of the wireless communications device. High band antennas allow for the operation of the wireless communications device in frequency ranges which are higher than the frequency ranges in which the low band antennas allow for the operation of the wireless communications device.

Figure 1:
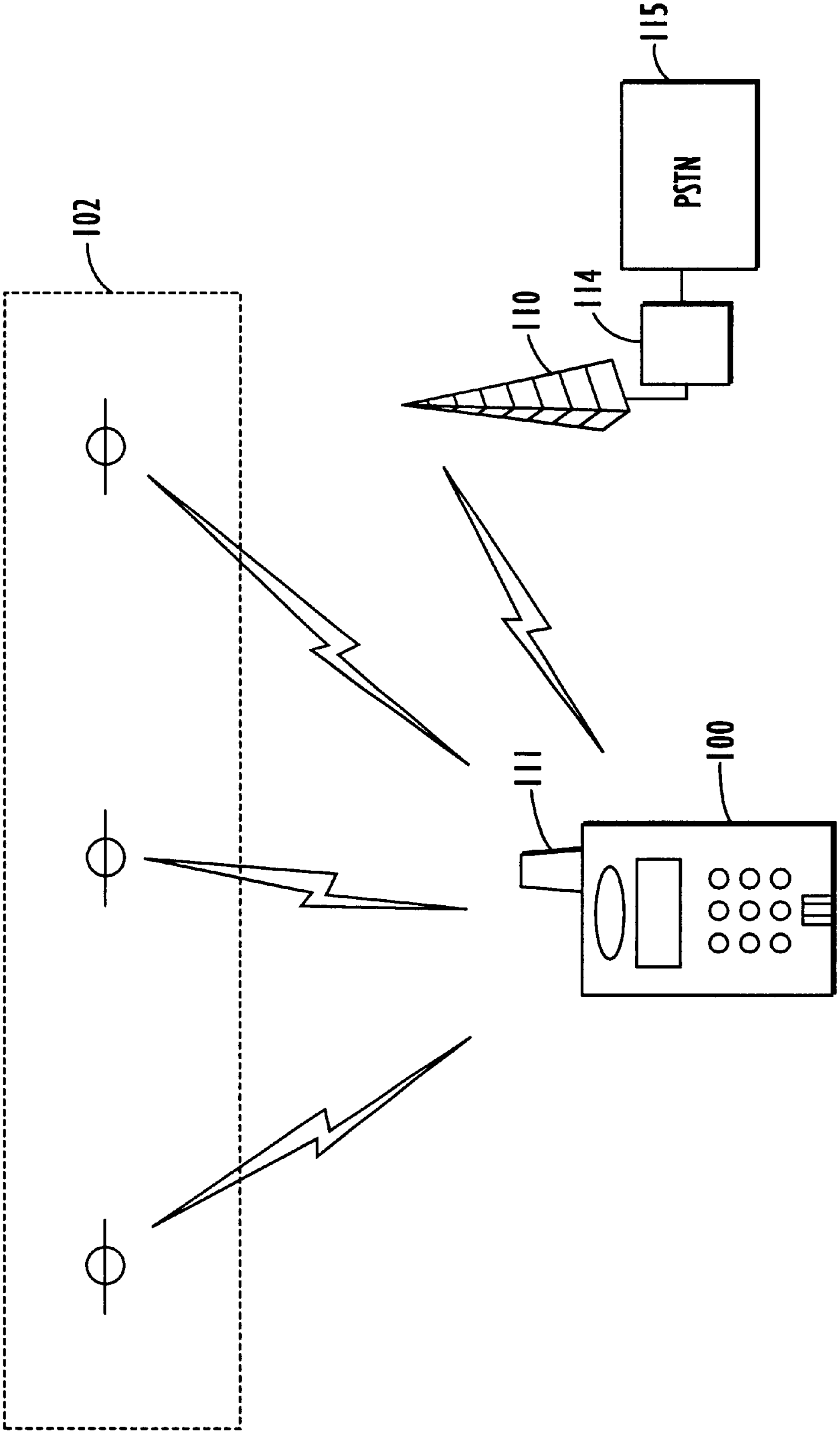
FIG. 1 is a diagram of a wireless communications device that receives GPS signals and communications signals according to the present invention.

FIG. 1 is a diagram that illustrates a cellular communications system and a Global Positioning System (GPS) 102 which provide communications signals and GPS signals respectively to a wireless communications device 100. The cellular communications system provides service which enables the wireless communications device 100 to originate and receive calls by transmitting and receiving communications signals to and from a base station 110 coupled to a Public Switched Telephone Network (PSTN) 115 via a Mobile Switching Center 114. The GPS system 102 provides GPS signals which enable the wireless communications device 100 to determine a location of the wireless communications device. The wireless communications device 100 includes an integrated antenna assembly 111 that provides signal reception for the cellular and GPS signals provided to the wireless communications device 100.

GPS systems are described, for example, in U.S. Pat. No. 5,884,214 to Krasner entitled GPS Receiver and Method for Processing GPS Signals which is incorporated herein by reference. Cellular communication systems are described, for example, in U.S. Pat. No. 5,867,765 to Nilsson entitled Non-geostationary Satellite Mobile Communication System Integration with Network Principles for Terrestrial Cellular which is incorporated herein by reference.

Figure 2:
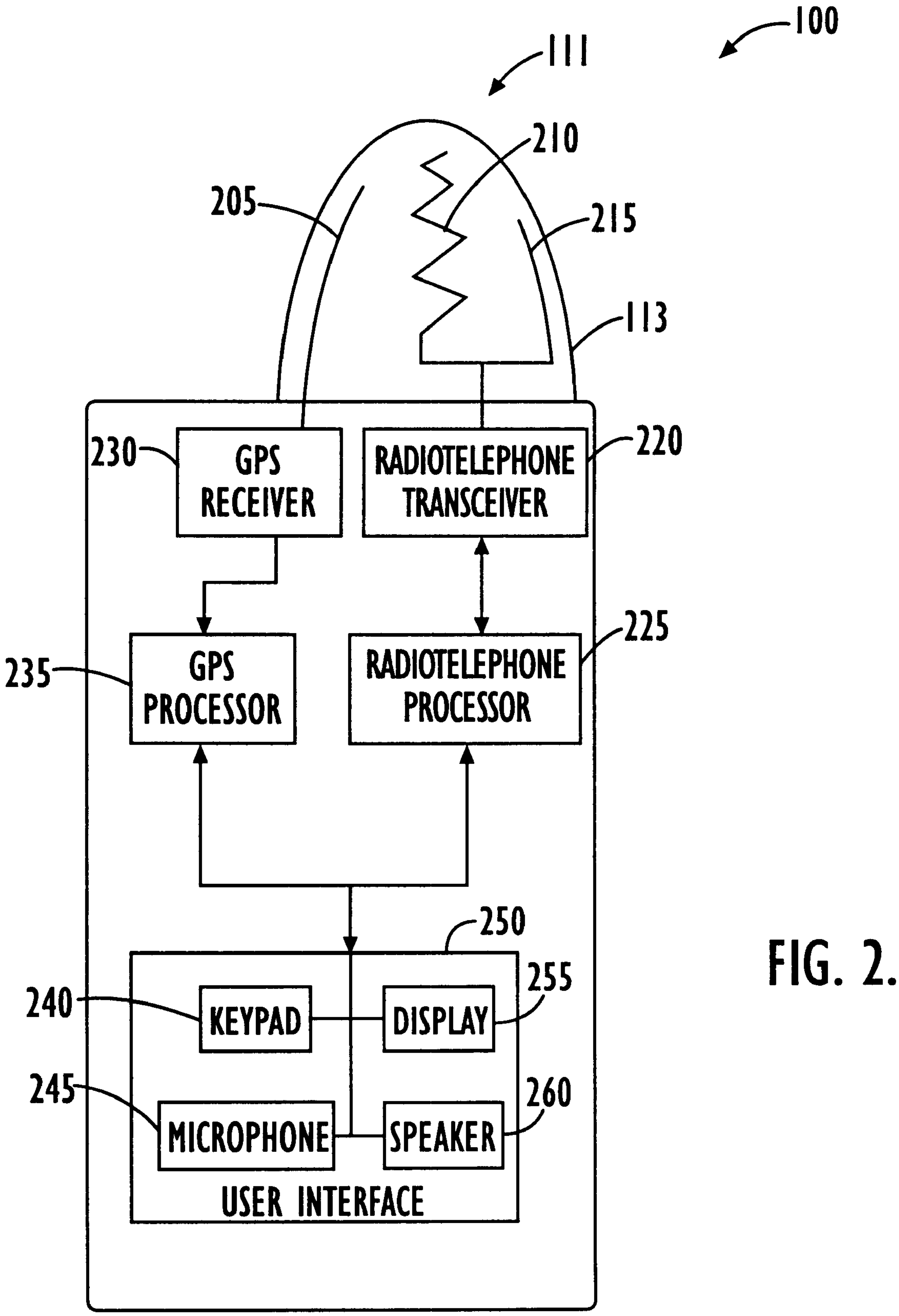
FIG. 2 is a block diagram of a radiotelephone including an integrated antenna assembly according to the present invention.

FIG. 2 is a block diagram of a wireless communications device 100 according to an embodiment of the present invention. As shown in FIG. 2, the integrated antenna assembly 111 can include three antennas: a first cellular antenna 215, a second cellular antenna 210, and a GPS antenna 205 in an antenna housing 113, wherein the second cellular antenna 210 is located between the first cellular antenna 215 and the GPS antenna 205. The first cellular antenna 215 can be a high-band cellular antenna such as, for example, a DCS antenna which operates in a frequency range between about 1710 and 1880 MHz or a PCS antenna which operates in a frequency range between about 1850 and 1990 MHz. The second cellular antenna 210 can be a low-band antenna such as a GSM antenna which operates in a frequency range between about 880 and 960 MHz, or an IS 136 antenna which operates in a frequency range between about 824 and 894 MHz. The GPS antenna 205 can be a high-band antenna operating in a frequency range between about 1574 and 1576 MHz. For example, the wireless communications device 100 may use the second cellular antenna 210 to operate in a GSM or IS136 system and use the first cellular antenna 215 to operate in a DCS or PCS system and use the GPS antenna 205 to determine its location using a GPS. According to the present invention, locating the low-band second cellular antenna 210 between the high-band first cellular antenna 215 and the high-band GPS 205 antenna may reduce electromagnetic coupling between the high-band first cellular antenna 215 and the high-band GPS antenna 205.

The integrated antenna assembly 111 is adapted for coupling to the enclosure of the wireless communications device 100 and can be enclosed in a covering layer to improve mechanical robustness of the integrated antenna assembly 111. In one embodiment, the integrated antenna assembly 111 has an arcuate shape. For example, the integrated antenna assembly 111 may have a parabolic shape such that the base of the integrated antenna assembly 111 coupled to wireless communications device 100 is wider than the tip of the integrated antenna assembly 111. In one embodiment, the integrated antenna assembly 111 can be covered by a soft overmold material which may reduce the force translated to the case of the wireless communications device 100 such as when it is dropped.

The first and second cellular antennas 215, 210 provide for the transmission/reception of the first and second communications signals by a cellular telephone transceiver 220. The cellular telephone transceiver 220 receives signals from and provides signals to a radiotelephone processor 225. The radiotelephone processor 225 processes the received communications signals to provide data to a user interface 250 and processes data from the user interface 250 to provide the communications signals to be transmitted from the wireless communications device 100. Radiotelephone communications can thus be provided. It will be understood that the first and second antennas 215, 210 can be electrically coupled in the integrated antenna assembly 111 as shown in FIG. 1 or electrically coupled inside the wireless communications device 100.

The GPS antenna 205 provides for the reception of GPS signals at a GPS receiver 230. The received GPS signals are provided to a GPS processor 235 which can determine a location of the wireless communications device 100. The GPS processor 235 can accept data from the user interface 250, and can provide data to the user interface 250, such as location data.

The user interface 250 can also include a keypad 240 which can be used to initiate calls in the cellular communications system or interact with the GPS processor 235. During the call, the user speaks into a microphone 245 which causes the radio telephone processor 225 and cellular telephone transceiver 220 to generate communication signals which are transmitted from the wireless communications device 100. The user may listen to a speaker 260 that reproduces audio data generated by the radiotelephone processor 225 from communication signals received at the wireless communications device 100. During operation, the user may refer to a display 255 to determine location information from the GPS processor 235 or other information relevant to the operation of the wireless communications device 100. The display 255 may also be used in conjunction with the keypad 240 such as when the user dials a number to place a call. The microphone 245, speaker 260, keypad 240, and display 255 are coupled to the radiotelephone processor 225 processor that controls operations of the wireless communications device 100.

Figure 3:
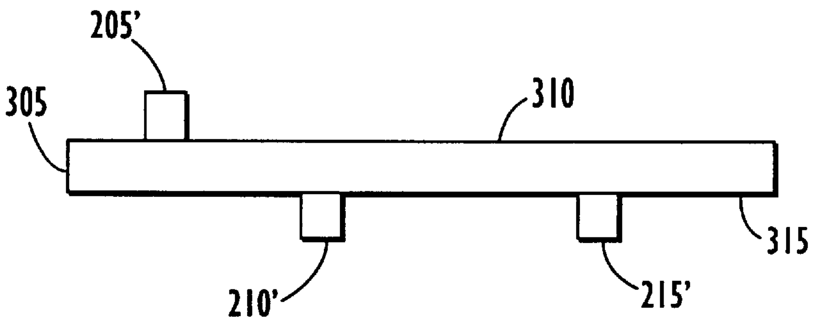
FIG. 3 is a cross-sectional diagram of an antenna backing according to the present invention taken along section line 3–3' of FIGS. 4A and 4B.
Figure 4A:
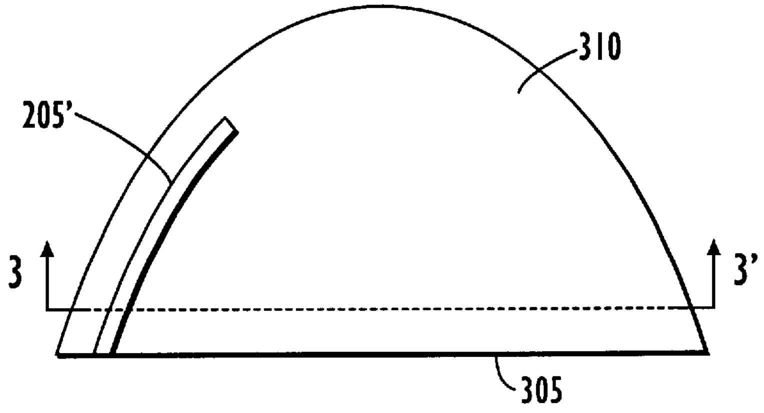
FIGS. 4A and 4B are diagrams of a first embodiment of an integrated antenna assembly according to the present invention.
Figure 4B:
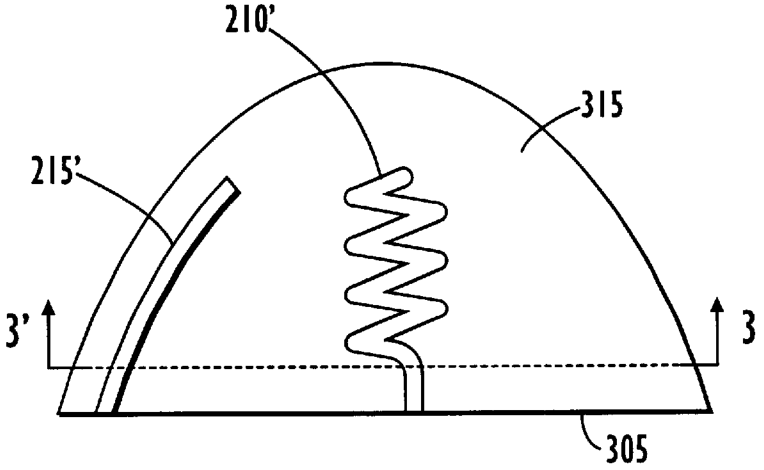

FIG. 3 is a cross-sectional diagram of the integrated antenna assembly 111 according to the present invention taken along section line 3–3' of FIGS. 4A and 4B. According to FIG. 3, the integrated antenna assembly 111 includes an antenna backing 305 upon which the GPS antenna 205 and the first and second cellular antennas 215, 210 are mounted in the antenna housing 113. The antenna backing 305 has a first face 310 and a second face 315.

In a preferred embodiment of the present invention, the antenna backing 305 comprises a planar dielectric material. The GPS antenna 205 and the first and second cellular antennas 215, 210 can comprise planar conductors formed on the dielectric material such as conductive etch on a printed circuit board. In another embodiment, the antenna backing 305 can have a curved surface such as when it is desired to conform the antenna backing 305 to a non-planar shape. For example, the antenna backing 305 may comprise a flexible dielectric circuit board having the GPS antenna 205 and the first and second cellular antennas 215, 210 formed thereon and curved to conform to a cylindrical shape.

In a first embodiment of the present invention, the GPS antenna 205' and the first and second cellular antennas 215', 210' are located on opposite faces of the antenna backing 305 as shown in FIGS. 4A and 4B, respectively. As shown in FIG. 4A, the GPS antenna 205' is located on the first face 310 of the antenna backing 305, and the first and second cellular antennas 215', 210' are located on the second face 315 of the antenna backing 305 as shown in FIG. 4B.

Figure 5A:
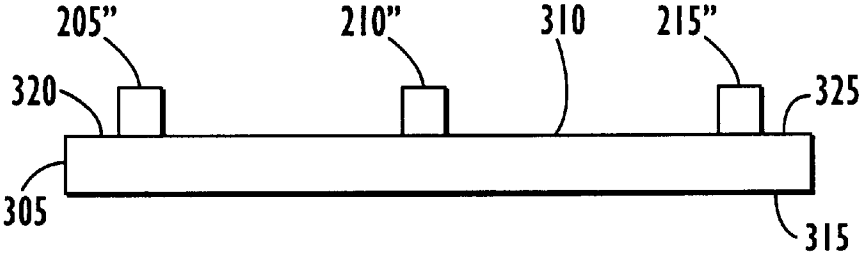
FIG. 5A is a cross-sectional diagram of an antenna backing according to the present invention taken along section line 5–5' of FIG. 5B.
Figure 5B:
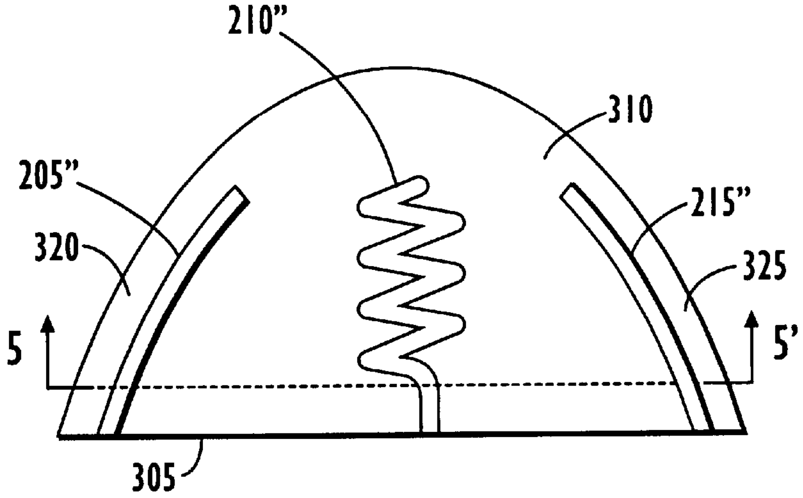
FIG. 5B is a diagram of a second embodiment of an integrated antenna assembly according to the present invention.

In an alternate embodiment of the present invention, the GPS antenna 205" and the first and second cellular antennas 215", 210" are located on the same face of the antenna backing 305 as shown in FIGS. 5A and 5B. FIG. 5A is a cross-sectional diagram of an antenna backing according to the present invention taken along section line 5–5' of FIG. 5B. As shown in FIG. 5B, The GPS antenna 205" may be located on the first face 310 near a first edge 320 of the antenna backing 305 and the first cellular antenna 215" may be located on the first face 310 near a second edge 325 of the antenna backing 305. The second cellular antenna 210" is located on the first face 310 of the antenna backing 305 between the GPS antenna 205" and the first cellular antenna 215". It will be understood that the first cellular antenna 215", the second cellular antenna 210", and the GPS antenna 205" can each be located on either the first face 310 or the second face 315 of the antenna backing.

Locating the second cellular antenna 210 between the GPS antenna 205 and the first cellular antenna 215 may reduce the electromagnetic coupling between the GPS antenna 205 and the first cellular antenna 215. It will be understood that the first cellular antenna 215, the second cellular antenna 210, and the GPS antenna 205 may be mounted on the antenna backing 305.

According to the present invention, the GPS antenna 205 and the first and second cellular antennas 215, 210 are included in the integrated antenna assembly 111, thereby reducing the need for a GPS antenna in a second housing connected to the wireless communications device. Consequently, the cost of providing multiple functionalities, such as cellular communications functionality and GPS functionality, in the wireless communications device 100 may be reduced by eliminating additional parts that would otherwise be needed to provide a separate GPS antenna.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A wireless communications device comprising:

a radiotelephone housing;

a GPS receiver in the radiotelephone housing, wherein the GPS receiver generates GPS location information;

a radiotelephone transceiver in the radiotelephone housing wherein the radiotelephone transceiver provides radiotelephone communications; and an integrated antenna assembly comprising, an integrated antenna housing coupled to and mounted on the radiotelephone housing, a first antenna in the integrated antenna housing and coupled to the GPS receiver wherein the first antenna provides GPS signal reception for the GPS receiver;

a second antenna in the integrated antenna housing and coupled to the radiotelephone transceiver wherein the second antenna provides transmission and reception of communications signals for the radiotelephone transceiver, wherein the wireless communications device further comprises a third antenna in the integrated antenna housing, wherein the third antenna provides transmission and reception of second communications signals for the wireless communications device.

2. The antenna assembly of claim 1, wherein the third antenna comprises a low-band antenna.

3. A wireless communications device comprising:

a radiotelephone housing;

a GPS receiver in the radiotelephone housing, wherein the GPS receiver generates GPS location information;

a radiotelephone transceiver in the radiotelephone housing wherein the radiotelephone transceiver provides radiotelephone communications; and an integrated antenna assembly comprising, an integrated antenna housing coupled to and mounted on the radiotelephone housing, a first antenna in the integrated antenna housing and coupled to the GPS receiver wherein the first antenna provides GPS signal reception for the GPS receiver;

a second antenna in the integrated antenna housing and coupled to the radiotelephone transceiver wherein the second antenna provides transmission and reception of communications signals for the radiotelephone transceiver, wherein the wireless communications device further comprises an antenna backing in the integrated antenna housing, wherein the first and second antennas are located on the antenna backing.

4. The antenna assembly of claim 3, wherein the antenna backing includes first and second faces, wherein the first antenna is on the first face of the antenna backing and the second antenna is on the second face of the antenna backing.

5. The antenna assembly of claim 3, wherein the antenna backing includes a face, wherein the first and second antennas are on the face the antenna backing.

6. The antenna assembly of claim 3 further comprising:

a third antenna on the antenna backing between the first and second antennas.

7. The antenna assembly of claim 3, wherein the antenna backing comprises a dielectric material.

8. A wireless communications device comprising:

a radiotelephone housing;

a GPS receiver in the radiotelephone housing, wherein the GPS receiver generates GPS location information;

a radiotelephone transceiver in the radiotelephone housing wherein the radiotelephone transceiver provides radiotelephone communications; and an integrated antenna assembly comprising, an integrated antenna housing coupled to and mounted on the radiotelephone housing, a first antenna in the integrated antenna housing and coupled to the GPS receiver wherein the first antenna provides GPS signal reception for the GPS receiver, and a second antenna in the integrated antenna housing and coupled to the radiotelephone transceiver wherein the second antenna provides transmission and reception of communications signals for the radiotelephone transceiver wherein the integrated antenna housing comprises a flat blade shape.

9. An integrated antenna assembly for a wireless communications device, the antenna assembly comprising:

an integrated antenna backing adapted to couple to and mount on the wireless communications device;

a first antenna on the integrated antenna backing, wherein the first antenna provides Global Positioning System signals for the wireless communications device; and a second antenna on the integrated antenna backing, wherein the second antenna provides transmission and reception of first communications signals for the wireless communications device.

10. The antenna assembly of claim 9 further comprising:

a third antenna on the antenna backing, wherein the third antenna provides second communications signals to and from the wireless communications device.

11. The antenna assembly of claim 10, wherein the antenna backing includes a first face and a second face; and wherein the third antenna is on the first face of the antenna backing between the second and first antennas.

12. The antenna assembly of claim 10, wherein the antenna backing includes a first face and a second face, wherein the first antenna is on the first face of the antenna backing and the second and third antennas are on the second face of the antenna backing.

13. The antenna assembly of claim 9, wherein the second antenna comprises an antenna chosen from the group consisting of a high-band antenna and a low-band antenna.

14. The antenna assembly of claim 10, wherein the third antenna comprises a low-band antenna.

15. The antenna assembly of claim 10, wherein the antenna backing comprises a dielectric material.

16. The antenna assembly of claim 9, wherein the second antenna comprises a quarter-wavelength monopole antenna.

17. The antenna assembly of claim 9, wherein the second antenna comprises a planar conductor on the antenna backing.

18. The antenna assembly of claim 9, wherein the antenna backing comprises a dielectric layer.

19. The antenna assembly of claim 10, wherein the third antenna comprises a quarter-wavelength monopole antenna.

20. The antenna assembly of claim 10, wherein the third antenna comprises a planar connector on the antenna backing.

21. The antenna assembly of claim 9, wherein the first antenna comprises a quarter-wavelength monopole antenna.

22. The antenna assembly of claim 9, wherein the first antenna comprises a planar conductor on the antenna backing.

23. The antenna assembly of claim 9, wherein the first and second antennas on the antenna backing are in a single integrated antenna housing connected to the wireless communications device.

24. The antenna assembly of claim 9, wherein the antenna backing includes a curved surface.

25. An integrated antenna assembly for a wireless communications device, the antenna assembly comprising:

an integrated antenna housing adapted to couple to and mount on the wireless communications device;

a first antenna in the integrated antenna housing, wherein the first antenna provides Global Positioning System signals for the wireless communications device; and a second antenna in the integrated antenna housing, wherein the second antenna provides transmission and reception of first communications signals for the wireless communications device, wherein the wireless communications device further comprises an antenna backing in the antenna housing, wherein the first and second antennas are located on the antenna backing.

26. An integrated antenna assembly for a wireless communications device, the antenna assembly comprising:

an integrated antenna housing adapted to couple to and mount on the wireless communications device;

a first antenna in the integrated antenna housing, wherein the first antenna provides Global Positioning System signals for the wireless communications device; and a second antenna in the integrated antenna housing, wherein the second antenna provides transmission and reception of first communications signals for the wireless communications device, wherein the wireless communications device further comprises a third antenna in the integrated antenna housing, wherein the third antenna provides transmission and reception of second communications signals for the wireless communications device.

27. The antenna assembly of claim 25, wherein the antenna backing includes a face, wherein the first and second antennas are on the face the antenna backing.

28. The antenna assembly of claim 27 further comprising:

a third antenna on the face of the antenna backing between the first and second antennas.

29. The antenna assembly of claim 25, wherein the antenna backing includes first and second faces, wherein the first antenna is on the first face of the antenna backing and the second antenna is on the second face of the antenna backing.

30. A wireless communications device comprising:

a radiotelephone housing;

a GPS receiver in the radiotelephone housing, wherein the GPS receiver generates GPS location information;

a radiotelephone transceiver in the radiotelephone housing wherein the radiotelephone transceiver provides radiotelephone communications; and an antenna backing configured to mount to the radiotelephone housing comprising, a first antenna on the antenna backing and coupled to the GPS receiver wherein the first antenna provides GPS signal reception for the GPS receiver, and a second antenna on the antenna backing and coupled to the radiotelephone transceiver wherein the second antenna provides transmission and reception of communications signals for the radiotelephone transceiver.

31. The antenna backing of claim 30, wherein the antenna backing includes first and second faces, wherein the first antenna is on the first face of the antenna backing and the second antenna is on the second face of the antenna backing.

32. The antenna backing of claim 30, wherein the second antenna comprises an antenna chosen from the group consisting of a high-band antenna and a low-band antenna.

33. The antenna backing of claim 30 wherein the first communications signals comprise radiotelephone communications signals.

34. The antenna backing of claim 30 further comprising:

a third antenna on the antenna backing, wherein the third antenna provides transmission and reception of second communications signals for the wireless communications device.

35. The antenna backing of claim 34, wherein the third antenna comprises a low-band antenna.

36. The antenna backing of claim 35, wherein the antenna backing comprises a dielectric material.

37. The antenna backing of claim 30, wherein the antenna backing includes a face, wherein the first and second antennas are on the face the antenna backing.

38. The antenna backing of claim 37 further comprising:

a third antenna on the face of the antenna backing between the first and second antennas.

39. A wireless communications device comprising:

a radiotelephone housing;

a radiotelephone processor in the radiotelephone housing wherein the radiotelephone processor provides radiotelephone communications; and an integrated antenna assembly comprising, an integrated antenna housing coupled to and mounted on the radiotelephone housing, a first antenna in the integrated antenna housing and coupled to the radiotelephone processor, wherein the first antenna provides transmission and reception of first high-band communications signals for the radiotelephone processor, a second antenna in the integrated antenna housing and coupled to the radiotelephone processor, wherein the second antenna provides transmission and reception of second high-band communications signals for the radiotelephone processor, and a third antenna located between the first and second antennas in the integrated antenna housing, wherein the third antenna provides transmission and reception of low-band communications signals for the radiotelephone processor.

40. The wireless communications device of claim 39, wherein the first and second high band communications signals are in a range between about 1574 MHz and 1990 MHz and wherein the low-band communications signals are in a range between about 824 and 960 MHz.

41. The wireless communications device of claim 39 further comprising an antenna backing in the integrated antenna housing, wherein the first, second and third antennas are on the antenna backing.

42. The wireless communications device of claim 41, wherein the antenna backing includes opposing first and second faces, wherein the first, second, and third antennas are mounted on either face of the antenna backing.

43. The wireless communications device of claim 39, wherein the first antenna comprises a quarter-wavelength monopole antenna.

44. The wireless communications device of claim 39, wherein the first antenna comprises a planar conductor on the antenna backing.

45. The wireless communications device of claim 39, wherein the second antenna comprises a quarter-wavelength monopole antenna.

46. The wireless communications device of claim 39, wherein the second antenna comprises a planar conductor on the antenna backing.

47. The wireless communications device of claim 39, wherein the third antenna comprises a quarter-wavelength monopole antenna.

48. The wireless communications device of claim 39, wherein the third antenna comprises a planar conductor on the antenna backing.

49. The wireless communications device of claim 39, wherein the first antenna comprises a GPS antenna that provides GPS signal reception.

50. The wireless communications device of claim 39, wherein the second antenna comprises a first cellular antenna.

51. The wireless communications device of claim 39, wherein the third antenna comprises a second cellular antenna.

52. The wireless communications device of claim 39 wherein the integrated antenna housing is rigidly mounted on the radiotelephone housing.

* * * * *